United States Patent
Walker et al.

[11] Patent Number: 6,134,779
[45] Date of Patent: Oct. 24, 2000

[54] HIGH PERFORMANCE FORGED ALUMINUM CONNECTING ROD AND METHOD OF MAKING THE SAME

[76] Inventors: Bruce K. Walker, 17219 Anne Breda, Canyon Countr, Calif. 91351; Raymal Childs, 15043 San Jose St., Mission Hills, Calif. 91345

[21] Appl. No.: 09/192,247

[22] Filed: Nov. 16, 1998

[51] Int. Cl.⁷ .................................................. B21D 53/84
[52] U.S. Cl. ...................... 29/888.092; 29/425; 29/558; 74/579 E; 74/579 R; 148/689
[58] Field of Search ...................... 29/888.09, 888.092, 29/888.08, 425, DIG. 18, 897.2, 558; 148/689, 690, 691; 74/567, 579 E, 579 R

[56] References Cited

U.S. PATENT DOCUMENTS

| | | | |
|---|---|---|---|
| 4,030,179 | 6/1977 | Schwarz | 29/888.092 |
| 4,863,528 | 9/1989 | Brown et al. | 148/695 |
| 4,993,134 | 2/1991 | Hoag et al. | 29/888.092 |
| 5,353,500 | 10/1994 | Hoag et al. | 29/888.092 |
| 5,415,710 | 5/1995 | Shiina et al. | 148/439 |
| 5,544,413 | 8/1996 | Stevens et al. | 29/888.092 |
| 5,566,449 | 10/1996 | Okamoto et al. | 29/888.092 |
| 5,820,705 | 10/1998 | Yu et al. | 148/633 |
| 5,865,911 | 2/1999 | Miyasato et al. | 148/439 |
| 5,865,914 | 2/1999 | Karabin et al. | 148/691 |

*Primary Examiner*—S. Thomas Hughes
*Assistant Examiner*—Trinh Nguyen
*Attorney, Agent, or Firm*—Robert J. Schaap

[57] ABSTRACT

An improved high performance aluminum connecting rod and a method for manufacturing such a connecting rod are disclosed, the connecting rod being capable of carrying particularly high compressive loads with a substantially reduced deformation resulting from such high compressive loads. In the preferred embodiment, the connecting rod of the present invention is made of an extruded bar stock forging made of an aluminum alloy material which is forged and machined to make the connecting rod. The connecting rod of the present invention has a substantially increased compressive yield strength as well as a substantially increased tensile yield strength. This increase in the compressive yield strength of the connecting rod of the present invention effectively prevents bending of the connecting rod beam, elongation of the wrist pin bore, and a marked deterioration in the roundness of the bearing housing bore. The improved high performance aluminum connecting rod of the present invention finds particular application in the field of high performance racing engines.

30 Claims, 3 Drawing Sheets

HIGH PERFORMANCE FORGED ALUMINUM CONNECTING ROD AND METHOD OF MAKING THE SAME

BACKGROUND OF THE INVENTION

Field of the Invention

The present invention relates generally to the field of manufacturing forged aluminum connecting rods, and more particularly to an improved high performance aluminum connecting rod and a method for manufacturing such a connecting rod which is capable of carrying particularly high compressive loads with a substantially reduced deformation resulting from such high compressive loads, the improved high performance aluminum connecting rod of the present invention finding particular application in the field of high performance racing engines.

Internal combustion engines used in automobiles typically have pistons which reciprocate in cylinders contained in an engine block, with the pistons driving connecting rods which in turn drive a single geometrically complex crankshaft, causing it to rotate within the engine block. The pistons are cylindrical and are hollowed out at the end facing the crankshaft. Wrist pins extending diametrically through the pistons near the open end thereof are used to connect each piston to one end of a connecting rod which has a cylindrical wrist pin bore located therein, which end is referred to as the pin end of the connecting rod.

The other end of each connecting rod is connected to the crankshaft at a particular cylindrical bearing location on the crankshaft. This end of the connecting rod, which is referred to as the crank end, also has a cylindrical bearing housing bore located therein. Typically, an annular bearing is located between the bearing housing bore at the crank end of the connecting rod and the cylindrical bearing location on the crankshaft.

The crank end of the connecting rod is split into two segments, with the split being defined by a plane which lies at an angle to the longitudinal axis of the connecting rod (the axis extending between the pin end and the crank end of the connecting rod), which plane divides the bearing housing bore at the crank end of the connecting rod in half. The end of the main segment of the connecting rod (the segment which includes the pin end) which is opposite the pin end is referred to as the fork of the connecting rod, since it includes half of the bearing housing bore at the crank end of the connecting rod.

The smaller segment of the connecting rod is referred to as the cap or the bearing cap, and it includes the other half of the bearing housing bore at the crank end of the connecting rod. The cap typically is retained in position on the fork by two bolts located on opposite sides of the cap and fork. The bolts extend into holes located in the cap, and are screwed into threaded apertures located in the fork.

As is generally well known in the art, the development of the reciprocating internal combustion engine has resulted in ever-smaller engines which are capable of generating an ever-increasing amount of horsepower, at ever-higher RPM's. It will be appreciated by those skilled in the art that with the increasing power has come increased stresses which are placed on the various parts of the engine, including increased stresses placed on the connecting rods and bearings. These advancements in engine technology have resulted in a demand for connecting rods which are both lighter and stronger than previous generations of connecting rods.

Nowhere is this demand for improved connecting rod strength and lightness more important than in the field of auto racing, including gas, alcohol, and nitro engines which are used in drag racing. These engines are subjected to incredible loads, and this is particularly true with respect to the ultra high combustion pressure loads that the connecting rods are subjected to. The loads are compressive in nature, and whenever the yield strength of the connecting rods is exceeded, they will be damaged or destroyed. Typical damage which can result from these stresses includes bending of the connecting rod beam (the portion of the connecting rod extending between the pin end and the fork), elongation of the wrist pin bore, and deformation of the bearing housing bore, particularly in the cap of the connecting rod.

The materials which are used to make high performance connecting rods are almost exclusively high tech aluminum alloys, which possess both relatively light weight and the requisite high degree of material strength. Aluminum alloys have been used for high performance engines such as those used in drag racing for thirty years, with the first alloy being used being 2014-T6 aluminum alloy, which has a compressive yield strength of 58 ksi. More recently, 7075-T6 aluminum alloy has been used, which has a substantially higher compressive yield strength of 72 ksi. Neither of these alloys currently possesses sufficient compressive yield strength to withstand the compression loads of current drag racing engine technology.

In addition, the manufacture of high performance aluminum connecting rods from aluminum material must be of a nature which enhances, and in no way reduces, the material strength characteristics of the aluminum material. To understand this, it is necessary to briefly describe the manufacture of connecting rods. There are three primary methods of manufacturing connecting rods: casting, powder metal manufacturing rolled plate stock, and foregoing. Each of these methods will be briefly described below.

Casting involves heating the metal alloy which will be used until it is molten, and pouring the molten metal alloy into "sprews" which are connected to "runners" which channel the molten metal alloy into a multiple cavity mold. The molten metal alloy fills the mold, and vents through "risers." After cooling, the metal casting is separated from the mold, the sprews, runners, and risers are removed, and the casting is machined.

Casting is a relatively low-cost manufacturing process, and results in a product with tight dimensional tolerances. Unfortunately, casting has several disadvantages, including relatively low strength characteristics, an absence of grain flow strength, and possible porosity of the cast article. These negative characteristics make casting an unacceptable manufacturing process for high performance aluminum connecting rods.

Powder metal manufacturing involves placing a mixture of metal powder into a preformed die, and then compressing the powder in the die with a compacting press to mechanically bond the metal powder into a preform. The preform is then sintered to chemically bond the powder in the preform, and the preform is then heated and forged in a press. The resulting article is then machined to finish it.

Powder metal manufacturing results in high tolerances and uniform material composition of the finished article. Unfortunately, powder metal manufacturing is a relatively high cost operation, has a lack of grain flow strength, and results in a product which has relatively low tensile strength and impact strength. These negative characteristics make powder metal manufacturing an unacceptable manufacturing process for high performance aluminum connecting rods.

The rolled plate stock approach includes machining to form a billet connecting rod. However, the rod has relatively low strength and no grain flow strength.

Forging involves heating a piece of bar stock or rod stock (referred to as a forge slug) to a forging temperature, placing the heated forge slug into a two piece forging die defining a cavity within, and forging the forge slug using a forging press or forging hammers with multiple impacts. Excess material results in flashing extending between the two dies. This flashing is removed by placing the forging into a trim die, which is placed in a punch press to trim the flashing from the forged article. The part is then machined to finished dimensions.

Forging can be somewhat labor intensive due to the amount of machining which is necessary to produce the finished article, but it produces a product which has strength characteristics which are superior to those produced by casting rolled plate stock or powder metal manufacturing. This results from the fact that the natural grain of rolled metal stock is maintained in the finished product. The natural grain extends along the full length of the forged rod, from one end where it is expanded. The natural grain is not truncated, as is the case with a billet. As such, it will be apparent to those skilled in the art that forging is the preferred method of manufacture for high performance aluminum connecting rods.

It is accordingly the primary objective of the present invention that it provide an improved high performance aluminum connecting rod made of an improved material capable of withstanding the high compressive loads of current drag racing technology. The material used by the improved high performance aluminum connecting rod of the present invention must have lightweight construction which is comparable to presently known high performance aluminum materials such as 7075-T6, while possessing substantially enhanced compression yield strength characteristics as compared to such presently known materials. In addition, this improved material must retain or enhance all of the other favorable material characteristics of such presently known materials.

The improved high performance aluminum connecting rod of the present invention must be susceptible of manufacture by conventional forging techniques, with the forged part being readily machinable to the required finished dimensions. It is also necessary that the high performance characteristics of the aluminum material used to make the improved high performance aluminum connecting rod of the present invention not be adversely affected in the forging or machining operations. Most importantly, it is an objective of the improved high performance aluminum connecting rod of the present invention that it have sufficiently improved compression yield strength so as to hold both its dimensional length and the dimensional roundness of the wrist pin bore and the bearing housing bore.

The improved high performance aluminum connecting rod of the present invention must be of a construction which is both durable and long lasting, and it must remain within dimensional specifications throughout an extended operating lifetime. In order to enhance the market appeal of the present invention, it should also be of relatively inexpensive construction to thereby afford it the broadest possible market. Finally, it is also an objective that all of the aforesaid advantages and objectives of the improved high performance aluminum connecting rod of the present invention be achieved without incurring any substantial relative disadvantage.

SUMMARY OF THE INVENTION

The disadvantages and limitations of the background art discussed above are overcome by the improved high performance aluminum connecting rod of the present invention. With this invention, an improved high performance aluminum alloy is used as the material to fabricate the improved high performance aluminum connecting rod of the present invention. This material, which is a variant of the aluminum alloy taught in U.S. Pat. No. 5,221,377, to Hunt, Jr., et al., assigned of record to the Aluminum Company of America (Alcoa), has an improved combination of strength, density, and toughness, with a yield strength which is substantially higher than aluminum alloys such as 7075-T6 which have previously been used for connecting rods. U.S. Pat. No. 5,221,377 is hereby incorporated herein by reference.

This improved high performance aluminum alloy is obtained in extruded bar stock which is suitable for forging, either as rectangular bar stock or as round bar stock. The improved high performance aluminum alloy bar stock is of a suitable size and is cut to an appropriate length. The segment of high performance aluminum alloy bar stock is heated to a temperature which was determined after extensive testing. The heated segment of high performance aluminum alloy bar stock is then forged in a blocker die to rough out the shape of a connecting rod. The rough part is forged in a finisher die, and is then cooled.

The flashing resulting from the foregoing process is cleaned off of the forged part in a trim die. The forged part is then heat treated and etched, as is conventional in the art, after which it is penetrant inspected and ultrasonically tested. The forged part is then ball burnished, completing the first portion of the manufacturing process.

The forged part for the improved high performance aluminum connecting rod of the present invention includes the cap as an integral part thereof. (Alternately, the cap and the balance of the connecting rod may be forged as separate segments.) The cap may be removed from the fork of the connecting rod by using any of several methods which are conventional in the art. These methods include sawing the cap from the fork of the connecting rod, using a laser to remove the cap from the fork of the connecting rod, and fracturing the cap from the fork of the connecting rod.

A radius somewhat smaller than the bearing housing bore is machined in both the cap and the fork of the connecting rod. In the preferred embodiment, the adjoining faces of the cap and the fork of the connecting rod are machined into mutually engaging serrated surfaces. Alternatively, one can use hollow or solid aligning dowels. Holes are drilled into opposite sides of the cap, with smaller coaxial holes being drilled into the fork of the connecting rod. The holes in the fork of the connecting rod are threaded.

The cap is assembled onto the fork of the connecting rod using lubricated rod bolts, which are torqued to the proper degree. Bearing tangs and an oil-retaining aperature for a bearing retaining pin are also machined into the bearing housing bore, and an oil passage is machined into the wrist pin bore. The bearing housing bore is then rough bored, finish bored, and honed to the proper size. On the pin end of the connecting rod, the wrist pin bore is bored and honed to the proper size.

The improved high performance aluminum connecting rod of the present invention has been found to possess a number of significant advantages over previously-known connecting rods, with absolutely no attendant disadvantages. The improved high performance aluminum connecting rod of the present invention has a substantially increased compressive yield strength as well as a substantially increased tensile yield strength. Under testing in drag racing engines generating in excess of 6,000 horsepower, the improved high performance aluminum connecting rod of the present invention has been found to have a compressive yield strength of 25 percent greater than 7075-T6.

This increase in the compressive yield strength of the improved high performance aluminum connecting rod of the present invention effectively prevents bending of the connecting rod beam, elongation of the wrist pin bore, and a marked deterioration in the roundness of the bearing housing bore. As compared to a conventional high performance aluminum connecting rod made of 7075-T6, which typically experiences a compression of 0.004 to 0.005 inch after one run at full load, the improved high performance aluminum connecting rod of the present invention remains within 0.001 inch of its original dimension after one run at full load.

The wrist pin bore of the improved high performance aluminum connecting rod of the present invention remains within 0.0003 to 0.0005 inch of its original dimension after one run at full load, as compared to the wrist pin bore of a conventional high performance aluminum connecting rod, which loses roundness of 0.002 to 0.003 inch after one run at full load. Finally, the bearing housing bore of the improved high performance aluminum connecting rod of the present invention remains within 0.0003 to 0.0005 inch of its original dimension after one run at full load, as compared to the bearing housing bore of a conventional high performance aluminum connecting rod, which loses roundness of 0.001 to 0.0015 inch after one run at full load. These increases in strength and performance are particularly significant in view of the fact that conventional high performance aluminum connecting rod made of 7075-T6 were the state of the art prior to the development of the improved high performance aluminum connecting rod of the present invention.

It may therefore be seen that the present invention teaches an improved high performance aluminum connecting rod made of an improved material capable of withstanding the high compressive loads of current drag racing engine technology. The material used by the improved high performance aluminum connecting rod of the present invention has lightweight construction which is comparable to presently known high performance aluminum materials such as 7075-T6, while possessing substantially enhanced compression yield strength characteristics as compared to such presently known materials. In addition, this improved material also retains or enhances all of the other favorable material characteristics of such presently known materials.

The improved high performance aluminum connecting rod of the present invention is readily susceptible of manufacture by conventional forging techniques, with the forged part being readily machinable to the required finished dimensions. The high performance characteristics of the aluminum material used to make the improved high performance aluminum connecting rod of the present invention are not adversely affected in either the forging or machining operations. Most importantly, the improved high performance aluminum connecting rod of the present invention has sufficiently improved compression yield strength so as to hold both its dimensional length and the dimensional roundness of the wrist pin bore and the bearing housing bore.

The improved high performance aluminum connecting rod of the present invention is of a construction which is both durable and long lasting, and which will remain within dimensional specifications throughout an extended operating lifetime. The improved high performance aluminum connecting rod of the present invention is also of relatively inexpensive construction to enhance its market appeal and to thereby afford it the broadest possible market. Finally, all of the aforesaid advantages and objectives of the improved high performance aluminum connecting rod of the present invention are achieved without incurring any substantial relative disadvantage.

DESCRIPTION OF THE DRAWINGS

These and other advantages of the improved high performance aluminum connecting rod of the present invention are best understood with reference to the drawings, in which.

DETAILED DESCRIPTION OF THE PREFERRED EMBODIMENT

The preferred embodiment of the improved high performance aluminum connecting rod of the present invention will be described in detail, but first the high performance aluminum alloy from which it is manufactured will be described in detail. As mentioned above, this high performance aluminum alloy is a variant of the aluminum alloy taught in Alcoa's U.S. Pat. No. 5,221,377, which has previously been incorporated herein by reference. Prior to the development leading up to the improved high performance aluminum connecting rod of the present invention, this aluminum alloy has not been known to be suitable for the fabrication of connecting rods.

The preferred high performance aluminum alloy used to make the improved high performance aluminum connecting rod of the present invention is an alloy available from Alcoa as 7055-T77511, also referred to as HP007. This aluminum alloy has been available from Alcoa for some time, but never made into extruded bar stock for forging. By working with Alcoa, the inventors of the invention described herein obtained 7055-T77511 aluminum alloy from Alcoa in extruded bar stock suitable for forging. The 7055-T77511 aluminum alloy used to fabricate the improved high performance aluminum connecting rod of the present invention is formulated (by weight) as follows:

| Material | Percentage by Weight |
| --- | --- |
| SI | 0.10 |
| FE | 0.15 |
| CU | 2.0–2.6 |
| MN | 0.05 |
| MG | 1.8–2.3 |
| CR | 0.04 |
| ZN | 7.6–8.4 |
| ZR | 0.08–0.25 |
| TI | 0.06 |
| AL | balance |

Figures 1, 2:
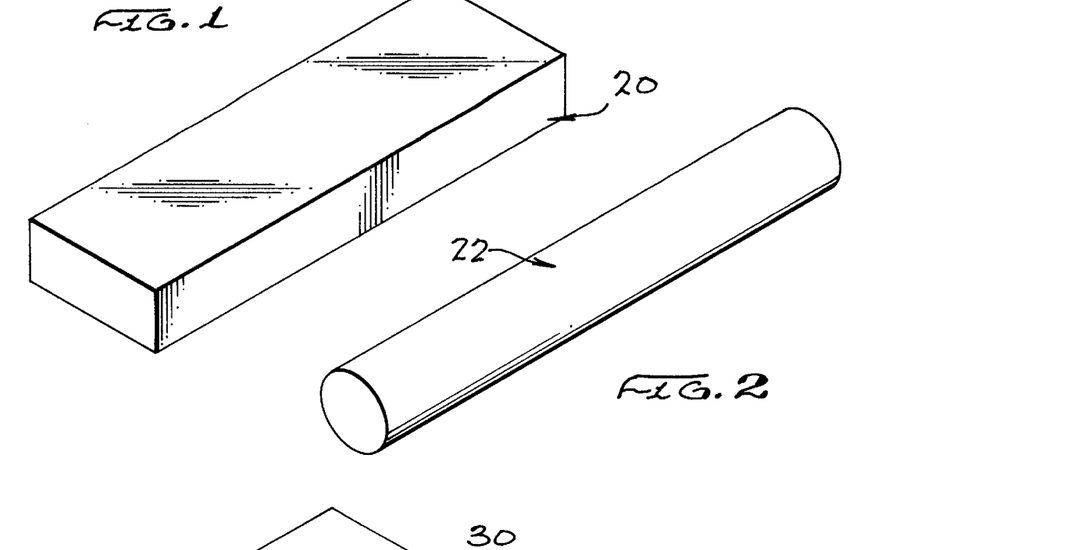
FIG. 1 is an isometric view of a rectangular bar stock blank which may be forged and machined into the improved high performance aluminum connecting rod of the present invention.
FIG. 2 is an isometric view of a round bar stock blank which may be used instead of the rectangular bar stock blank illustrated in FIG. 1.

In accord with the present invention, the 7055-T77511 aluminum alloy is provided as extruded bar stock which is suitable for forging, and may be either rectangular bar stock or round bar stock. Typically, a rectangular bar stock can be used to make a billet rod that is not forged. If rectangular bar stock is used as a blank for the forging operation, it is preferably between 1.0 and 2.5 inches in thickness, between 2.0 and 5.0 inches wide, and between 6.0 and 15.0 inches long. The preferred dimensions for a rectangular bar stock blank are approximately 1.5 inches in thickness, approximately 4.0 inches wide, and approximately 12.5 inches long. Such a rectangular bar stock blank 20 is illustrated in FIG. 1. Generally, the length should fill the die, but not be so long as to present the possibility of breaking the die.

If round bar stock is used as a blank for the forging operation, it is preferably between 1.5 and 2.5 inches in diameter, and between 11.5 and 14.5 inches long. The preferred dimensions for a round bar stock blank are approximately 2.0 inches in diameter, and approximately 12.5 inches long. Such a round bar stock blank 22 is illustrated in FIG. 2.

The single most critical portion of the manufacture of the improved high performance aluminum connecting rod of the present invention is the forging operation, which in large part determines the characteristics of the complete connecting rod. The temperature that the rectangular bar stock blank 20 or the round bar stock blank 22 is heated to for the forging operation is critical. In the development of the improved high performance aluminum connecting rod of the present invention, a substantial amount of testing was required in order to establish the temperature range which would produce a product with acceptable material characteristics, since the 7055-T77511 high performance aluminum alloy had never been supplied as extruded forging stock, far less been used to manufacture connecting rods.

In the experimental work on prototype forgings, machining revealed cracks in the vicinity of the bearing housing bore. In fact, approximately 20–25 percent of the prototype connecting rods were found to be cracked near the bearing housing bore. The experimental work which was performed included chemistry comparisons, mechanical property comparisons, and extrusion parameter comparisons of the 7055-T77511 high performance aluminum alloy; met allographic examinations and ultrasonic examinations of the bar stock; failure analyses of the connecting rods, which included ultrasonic examination of the connecting rods, macro etching of the connecting rods to examine material flow during forging, and met allographic examination of the connecting rods; and forging trials to duplicate failures and identify the causes therefor, including jogging samples, and forging temperature trials.

The results of this experimental work reduced the possible causes one by one. The chemical composition of three different lots was nearly identical. The mechanical properties of the three different lots were substantially similar. The actual extrusion parameters for the three different lots were also substantially similar.

The met allographic examinations of the bar stock revealed no material discontinuities. Similarly, the ultrasonic examination of the bar stock revealed no material discontinuities.

Macro etching of the connecting rods found no differences in material flow when comparing good connecting rods to failed connecting rods. Met allographic examination of failed connecting rods revealed internal voids.

Jogging samples during forging trials did not duplicate the failure mode. Finally, the cause of the failure was determined to be caused by a totally unexpected cause, namely forge slug temperatures above 800° Fahrenheit. Whenever the forge slug was heated to temperatures of approximately 800° Fahrenheit or above, internal voids resulted. The voids were quite small at approximately 800° Fahrenheit, and became progressively larger at higher temperatures.

Thus, 800° Fahrenheit was identified as the slug temperature at the top of the range of temperatures which could produce acceptable forgings. The lowest slug temperature which could be used was identified as 500° Fahrenheit. The optimum slug temperature was identified to be approximately 775° Fahrenheit.

Figures 3, 4:
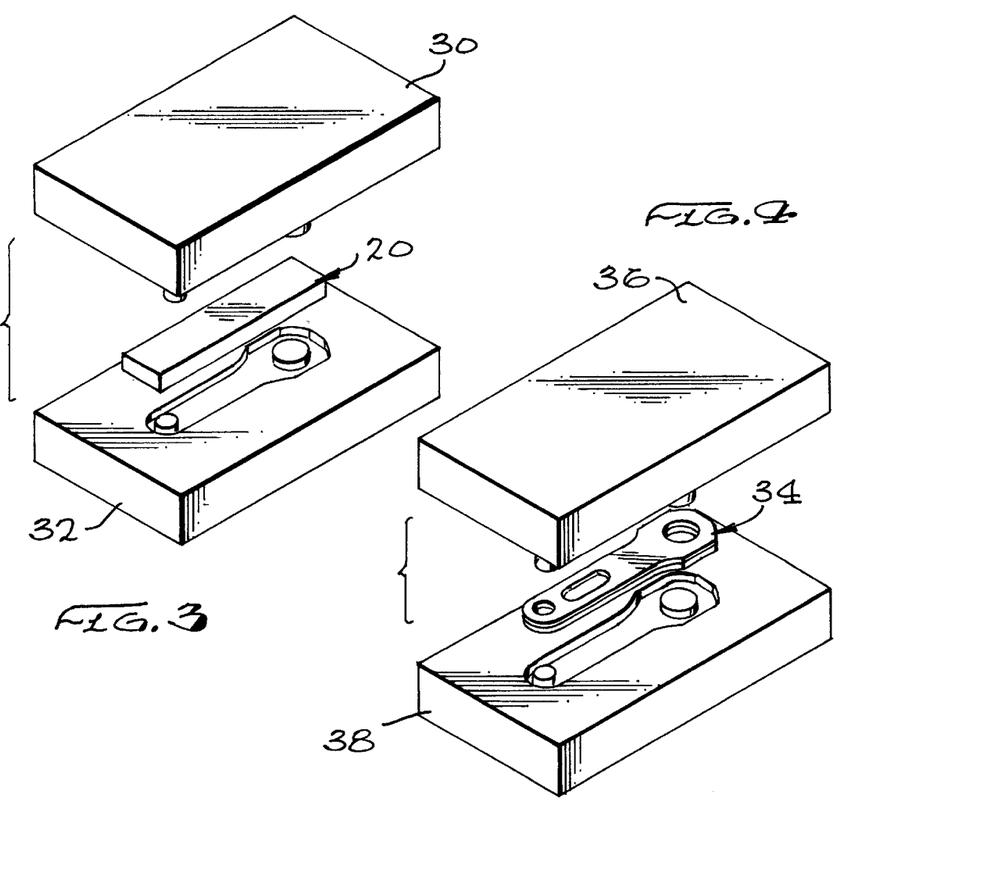
FIG. 3 is an isometric view of a blocker die for use in rough forging the rectangular bar stock blank illustrated in FIG. 1 into a rough forging.
FIG. 4 is an isometric view of a finisher die for use in finishing the rough forging produced by the blocker die illustrated in FIG. 3.

Extruded bar stock is preferred but rectangular bar stock can be used. A blocker die used to rough out the rectangular bar stock blank 20 is illustrated in FIG. 3. Blocker die halves 30 and 32 are shown with the rectangular bar stock blank 20 located therebetween. The forging operation is illustrated in FIG. 3, with the rectangular bar stock blank 20 heated to the forging temperature, which in the preferred embodiment is approximately 775° Fahrenheit. The heated rectangular bar stock blank 20 is the forging slug. The blocker die half 30 is hit, forcing it toward the blocker die half 32, forming the heated rectangular bar stock blank 20 into a rough forging 34 (which is illustrated in FIG. 4). In the preferred embodiment, the forging slug is struck only once in the blocker die.

Figure 5:
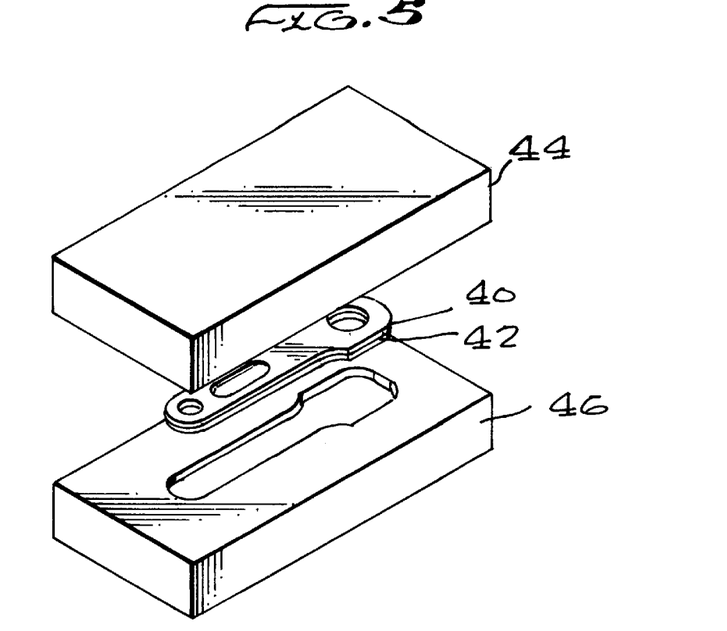
FIG. 5 is an isometric view of a trim die for use in trimming the flashing off of the finished forging produced by the finisher die illustrated in FIG. 4.

A finisher die used to finish the rough forging 34 is illustrated in FIG. 4. Finisher die halves 36 and 38 are shown with the rough forging 34 located therebetween. The finishing forging operation illustrated in FIG. 4 is performed immediately after the rough forging operation illustrated in FIG. 3. The finisher die half 36 is hit, forcing it toward the finisher die half 38, forming the rough forging 34 into a finished forging 40 (which is illustrated in FIG. 5). In the preferred embodiment, the rough forging 34 is truck in the finisher die, die cleaned, and hit again.

A trim die used to trim the flashing (indicated generally by the reference numeral 42) from the finished forging 40 is illustrated in FIG. 5. Trim die halves 44 and 46 are shown with the finished forging 40 located therebetween. The trimming operation illustrated in FIG. 5 is performed after cooling to room temperature after the finishing forging operation illustrated in FIG. 4. The trim die half 44 is hit, forcing it toward the trim die half 46, trimming the flashing 42 from the finished forging 40 and completing the forging operation. In the preferred embodiment, the finished forging 40 need be struck only once in the trim die.

The connecting rod forging is then heat treated, following which it is etched. At this point, the connecting rod forging is then penetrant inspected and ultrasonically tested in order to detect any latent defects. The connecting rod forging is then ball burnished, which completes the portion of the manufacturing process prior to machining.

Figure 6:
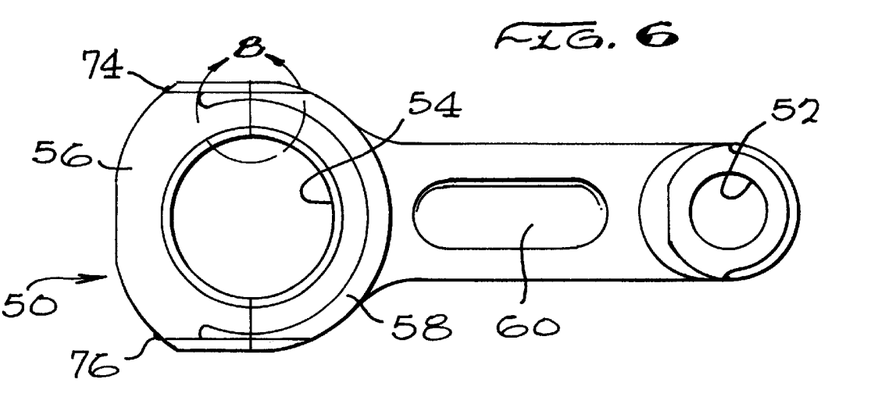
FIG. 6 is a side plan view of the improved high performance aluminum connecting rod of the present invention which has been machined from the trimmed forging produced by the trim die illustrated in FIG. 5.
Figure 7:
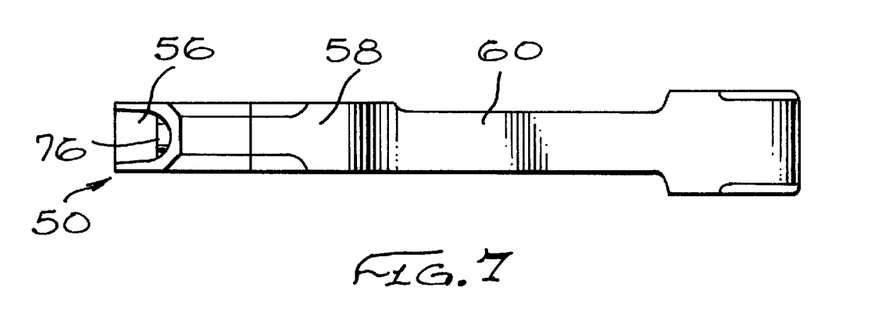
FIG. 7 is an edge plan view of the improved high performance aluminum connecting rod illustrated in FIG. 6.

The various machining steps required to complete the manufacture of the improved high performance aluminum connecting rod 50 will be described with reference to the remaining figures, which show the improved high performance aluminum connecting rod 50 in its completed form. Referring first to FIGS. 6 and 7, the improved high performance aluminum connecting rod 50 is illustrated with its pin end on the right and its crank end at the left. A wrist pin bore 52 is illustrated in the pin end of the improved high performance aluminum connecting rod 50, and a bearing housing bore 54 is illustrated in the crank end of the improved high performance aluminum connecting rod 50.

The improved high performance aluminum connecting rod 50 is split to form a cap 56 and a fork 58 of the improved high performance aluminum connecting rod 50. (As mentioned above, the cap 56 and the balance of the improved high performance aluminum connecting rod 50 may alternatively be forged as two separate segments.) As best illustrated in FIG. 6, the split between the cap 56 and the fork 58 is defined by a plane which can be orthogonal or at any angle to the longitudinal axis of the improved high performance aluminum connecting rod 50 (the axis extending between the pin end and the crank end of the improved high performance aluminum connecting rod 50), which plane divides the bearing housing bore 54 at the crank end of the improved high performance aluminum connecting rod 50 in half. The portion of the improved high performance aluminum connecting rod 50 located between the fork 58 and the rod end of the improved high performance aluminum connecting rod 50 forms the rod beam 60 of the improved high performance aluminum connecting rod 50.

As mentioned above, there are three methods which may be used to remove the cap 56 from the fork 58 of the improved high performance aluminum connecting rod 50, all of which are conventional in the art. These methods include sawing the cap 56 from the fork 58 of the improved high performance aluminum connecting rod 50, using a laser to divide the cap 56 from the fork 58 of the improved high performance aluminum connecting rod 50, and fracturing the cap 56 from the fork 58 of the improved high performance aluminum connecting rod 50. While the first two methods are self-explanatory, examples of fracturing the cap 56 from the fork 58 of the improved high performance aluminum connecting rod 50 are provided in U.S. Pat. No. 5,105,538, to Hoag et al., U.S. Pat. No. 5,507,093, to Wittenstein et al., and U.S. Pat. No. 5,655,296, to Ravenhorst et al. U.S. Pat. No. 5,105,538, U.S. Pat. No. 5,507,093, and U.S. Pat. No. 5,655,296 are each hereby incorporated herein by reference.

Figure 8:
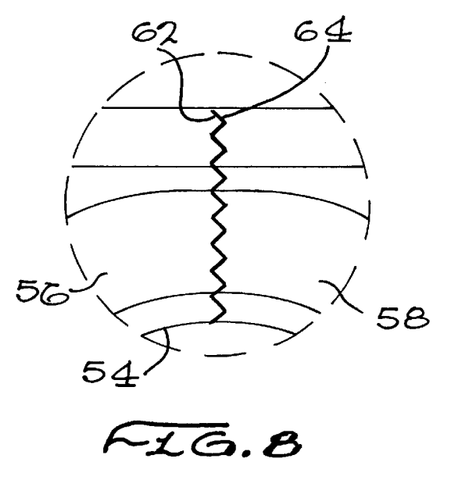
FIG. 8 is an enlarged view of a portion of the improved high performance aluminum connecting rod illustrated in FIGS. 6 and 7, showing the mutually engaging serrated surfaces which have been machined into the cap and the fork of the connecting rod.

Following the separation of the cap 56 from the fork 58 of the improved high performance aluminum connecting rod 50, a radius approximately 0.005 larger than the finished radius of the bearing housing bore 54 is machined into both the cap 56 and the fork 58. Referring particularly to FIG. 8 in addition to FIGS. 6, 7, and 9, in the preferred embodiment of the present invention, the adjoining faces of the cap 56 and the fork 58 of the improved high performance aluminum connecting rod 50 are machined into mutually engaging serrated surfaces 62 and 64, respectively.

Figure 9:
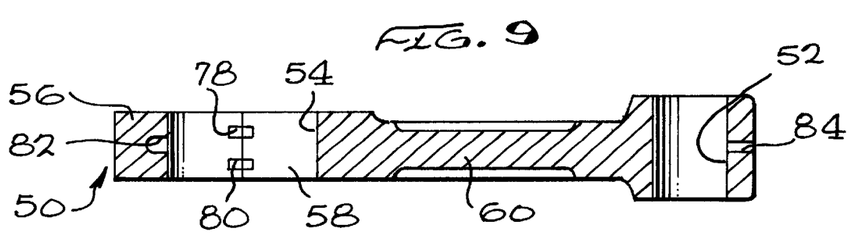
FIG. 9 is a cross-sectional edge view of the improved high performance aluminum connecting rod illustrated in FIGS. 6 and 7, showing keyways (bearing tang grooves) and a bearing retaining pin lock aperture machined into the bearing housing bore, and an oil passage machined into the wrist pin bore.
Figure 10:
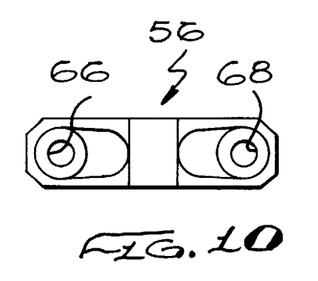
FIG. 10 is a bottom plan view of the cap illustrated in FIGS. 6, 7, and 9.
Figure 11:
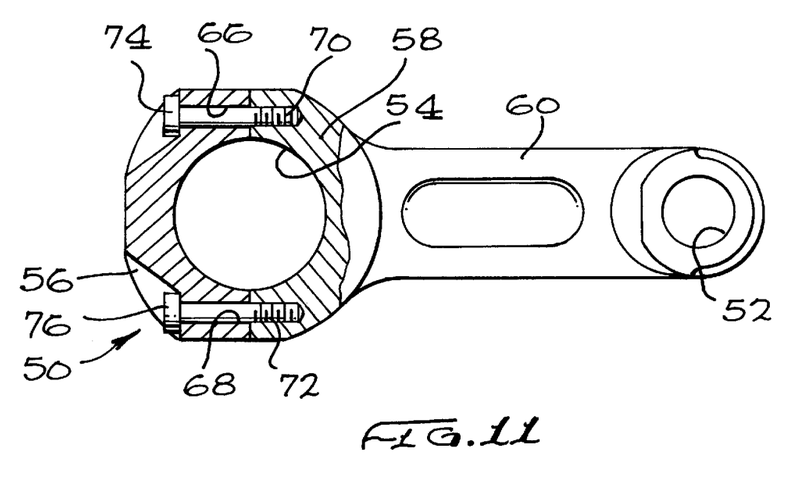
FIG. 11 is a partial sectional view from the side of the improved high performance aluminum connecting rod illustrated in FIGS. 6, 7, and 9, including the cap illustrated in FIGS. 6, 7, 9, and 10, and showing two rod bolts which are used to retain the cap on the fork of the connecting rod.

Referring now to FIGS. 6, 7, 9, and particularly 10 and 11, two holes 66 and 68 are drilled into the cap 56. The holes 66 and 68 are located in the cap 56 on opposite sides of the bearing housing bore 54, and are parallel to the axis of the improved high performance aluminum connecting rod 50 (which extends between the rod end and the crank end of the improved high performance aluminum connecting rod 50). Referring particularly to FIG. 11, two smaller holes 70 and 72 are drilled into the fork 58 of the improved high performance aluminum connecting rod 50. The holes 70 and 72 are located in the fork 58 on opposite sides of the bearing housing bore 54, and are coaxial with the holes 66 and 68 in the cap 56. The holes 70 and 72 in the fork 58 of the improved high performance aluminum connecting rod 50 are threaded.

Next, the cap 56 is assembled onto the fork 58 of the improved high performance aluminum connecting rod 50 using two rod bolts 74 and 76, which are, by way of example, 7/16–20 UNFJ Class 3A bolts with a Rockwell of 51c to 52c, rated at 272 ksi. The rod bolts 74 and 76 are preferably lubricated with S.A.E. 30 weight motor oil, and are torqued to the proper degree, preferably approximately 85 Ft. Lbs.

Four keyways, (bearing tang grooves) two of which are referred to by the reference numerals 78 and 80, are machined into the cap 56 and the fork 58 in the bearing housing bore 54 at the location of the split between the cap 56 and the fork 58, as best illustrated in FIG. 9. The other two keyways which are not illustrated herein are located on the opposite side of the bearing housing bore 54 from the keyways 78 and 80. Also machined into the bearing housing bore 54 in the cap 56 is a bearing pin lock aperture 82, which is illustrated in FIG. 9. An oil passage 84, which is also illustrated in FIG. 9, is machined into the wrist pin bore 52.

Following the assembly of the cap 56 to the fork 58 of the improved high performance aluminum connecting rod 50 using the rod bolts 74 and 76, the bearing housing bore 54 is then rough bored, finish bored, and honed to the proper size. On the pin end of the improved high performance aluminum connecting rod 50, the wrist pin bore 52 is bored and honed to the proper size. This completes the manufacture of the improved high performance aluminum connecting rod 50 of the present invention.

It may therefore be appreciated from the above detailed description of the preferred embodiment of the present invention that it teaches an improved high performance aluminum connecting rod made of an improved material capable of withstanding the high compressive loads of current drag racing engine technology. The material used by the improved high performance aluminum connecting rod of the present invention has lightweight construction which is comparable to presently known high performance aluminum materials such as 7075-T6, while possessing substantially enhanced compression yield strength characteristics as compared to such presently known materials. In addition, this improved material also retains or enhances all of the other favorable material characteristics of such presently known materials.

The improved high performance aluminum connecting rod of the present invention is readily susceptible of manufacture by conventional forging techniques, with the forged part being readily machinable to the required finished dimensions. The high performance characteristics of the aluminum material used to make the improved high performance aluminum connecting rod of the present invention are not adversely affected in either the forging or machining operations. Most importantly, the improved high performance aluminum connecting rod of the present invention has sufficiently improved compression yield strength so as to hold both its dimensional length and the dimensional roundness of the wrist pin bore and the bearing housing bore.

The improved high performance aluminum connecting rod of the present invention is of a construction which is both durable and long lasting, and which will remain within dimensional specifications throughout an extended operating lifetime. The improved high performance aluminum connecting rod of the present invention is also of relatively inexpensive construction to enhance its market appeal and to thereby afford it the broadest possible market. Finally, all of the aforesaid advantages and objectives of the improved high performance aluminum connecting rod of the present invention are achieved without incurring any substantial relative disadvantage.

Although an exemplary embodiment of the improved high performance aluminum connecting rod of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A method of manufacturing a light weight high performance aluminum connecting rod which does not suffer substantial elongation or deformation under high performance conditions without compromising strength characteristics, comprising:

providing an extruded aluminum alloy bar stock blank, said aluminum alloy comprising 7055-T77511 aluminum alloy material capable of withstanding high compressive loading;

heating said extruded aluminum alloy bar stock blank to a forging temperature having a range from approximately 500° Fahrenheit to approximately 800° Fahrenheit;

forging said heated extruded aluminum alloy bar stock blank into a connecting rod forging; and machining said connecting rod forging into a finished connected rod having improved compressive yield strength with a relatively long operating life without compromising dimensional parameters.

2. A method as defined in claim 1, wherein said extruded aluminum alloy bar stock blank comprises:

a piece of rectangular bar stock.

3. A method as defined in claim 2, wherein said piece of rectangular bar stock is between approximately 1.0 and 2.5 inches in thickness, between approximately 2.0 and 5.0 inches wide, and between approximately 6.0 and 15.0 inches long.

4. A method as defined in claim 3, wherein said piece of rectangular bar stock is approximately 1.5 inches in thickness, approximately 4.0 inches wide, and approximately 12.5 inches long.

5. A method as defined in claim 1, wherein said extruded aluminum alloy bar stock blank comprises:

a piece of round bar stock.

6. A method as defined in claim 5, wherein said piece of round bar stock is between approximately between 1.5 and 2.5 inches in diameter, and between approximately 11.5 and 14.5 inches long.

7. A method as defined in claim 6, wherein said piece of round bar stock is approximately 2.0 inches in diameter, and approximately 12.5 inches long.

8. A method as defined in claim 1, wherein said heating step comprises:

heating said extruded aluminum alloy bar stock blank to a forging temperature between approximately 750° Fahrenheit and approximately 800° Fahrenheit.

9. A method as defined in claim 1, wherein said heating step comprises:

heating said extruded aluminum alloy bar stock blank to a forging temperature less than approximately 800° Fahrenheit.

10. A method as defined in claim 1, wherein said heating step comprises:

heating said extruded aluminum alloy bar stock blank to a forging temperature of approximately 775° Fahrenheit.

11. A method as defined in claim 1, wherein said forging step comprises:

first, forging said heated extruded aluminum alloy bar stock blank into a rough forging in a blocker die; and second, forging said rough forging into a finished forging in a finisher die.

12. A method as defined in claim 11, wherein said heated extruded aluminum alloy bar stock blank is struck only once in said blocker die, and said rough forging is struck only once in said finisher die.

13. A method as defined in claim 11, wherein said finished forging has flashing thereupon, and wherein said forging step additionally comprises:

third, trimming said flashing from said finished forging to produce said connecting rod forging.

14. A method as defined in claim 13, wherein said connecting rod forging is heat treated, following which it is etched.

15. A method as defined in claim 1, wherein said connecting rod forging comprises:

a wrist pin bore located at a pin end thereof; and a bearing housing bore located at a crank end thereof, a longitudinal axis being defined between said pin end of said connecting rod forging and said crank end of said connecting rod forging;

and wherein said crank end of said connecting rod forging is split into a cap located at the distal end of said crank end and a fork by a plane which is essentially orthogonal to said longitudinal axis and which divides said bearing housing bore in half.

16. A method as defined in claim 15, wherein said machining step comprises:

machining said wrist pin bore to a specified diameter; and machining said bearing housing bore to a specified diameter.

17. A method as defined in claim 15, wherein said machining step comprises:

machining adjoining faces of said cap and said fork into mutually engaging serrated surfaces.

18. A method as defined in claim 15, wherein said machining step comprises:

drilling two holes into said cap on opposite sides of said bearing housing bore, which holes are parallel to said longitudinal axis; and drilling and tapping two threaded holes into said fork, said threaded holes being located in said fork on opposite sides of said bearing housing bore and being coaxial with said holes in said cap.

19. A method as defined in claim 18, additionally comprising:

attaching said cap to said fork by two rod bolts which are inserted through said two holes in said cap and are screwed into said two threaded holes in said fork.

20. A method as defined in claim 1, wherein said high performance aluminum connecting rod has a compressive yield strength of approximately 90 ksi.

21. A method of manufacturing a high performance light weight aluminum connection rod which does not suffer substantial elongation or deformation under high performance conditions without compromising strength characteristics, comprising:

providing an extruded aluminum alloy bar stock blank, said aluminum alloy consisting essentially of, by weight, about 7.6 to 8.4 percent zinc, about 1.8 to 2.3 percent magnesium, about 2.0 to 2.6 percent copper, and about 0.08 to 0.25 percent zirconium, the balance comprising substantially aluminum and containing other incidental elements and impurities and which aluminum alloy is capable of withstanding high compressive loading;

heating said extruded aluminum alloy bar stock blank to a forging temperature having a range from approximately 500° Fahrenheit to approximately 800 degrees Fahrenheit;

forging said heated extruded aluminum alloy bar stock blank into a connecting rod forging; and machining said connecting rod forging into a finished connecting rod having improved compressive yield strength with a relatively long operating life without compromising dimensional parameters.

22. A method as defined in claim 21, wherein said aluminum alloy comprises, by weight, about 0.05 percent manganese.

23. A method as defined in claim 21, wherein said aluminum alloy comprises, by weight, no more than about 0.4 percent total iron, silicon, and other impurities.

24. A method as defined in claim 21, wherein said aluminum alloy comprises, by weight, about 0.10 percent manganese and about 0.15 percent iron.

25. A method as defined in claim 21, wherein said aluminum alloy comprises one or more of, by weight, about 0.10 percent silicon, about 0.15 percent iron, about 0.05 percent manganese, about 0.04 percent chromium, and about 0.06 percent titanium.

26. A method as defined in claim 21, wherein said heating step comprises:

heating said extruded aluminum alloy bar stock blank to a forging temperature of approximately 775° Fahrenheit.

27. A method as defined in claim 21, wherein said high performance aluminum connecting rod has a compressive yield strength of approximately 90 ksi.

28. A method of manufacturing a high performance light weight aluminum connecting rod which does not suffer substantial elongation or deformation under high performance conditions without compromising strength characteristics, comprising:

providing an extruded aluminum alloy bar stock blank, said aluminum alloy consisting essentially of, by weight, about 7.6 to 8.4 percent zinc, about 1.8 to 2.3 percent magnesium, about 2.0 to 2.6 percent copper, about 0.08 to 0.25 percent zirconium, about 0.05 percent manganese, about 0.10 percent silicon, about 0.15 percent iron, about 0.04 percent chromium, and about 0.06 percent titanium, the balance comprising substantially aluminum and impurities and which aluminum alloy is capable of withstanding high compressive loading;

heating said extruded aluminum alloy bar stock blank to a forging temperature having a range from approximately 500 degrees Fahrenheit to approximately 800 degrees Fahrenheit;

forging said heated extruded aluminum alloy bar stock blank into a connecting rod forging; and machining said connecting rod forging into a finished connecting rod having improved compressive yield strength with a relatively long operating life without compromising dimensional parameters.

29. A method as defined in claim 28, wherein said heating step comprises:

heating said extruded aluminum alloy bar stock blank to a forging temperature of approximately 755° Fahrenheit.

30. A method as defined in claim 28, wherein said high performance aluminum connecting rod has a compressive yield strength of approximately 90 ksi.

* * * * *